V. MANCINI.
TIRE CHAIN.
APPLICATION FILED FEB. 11, 1911.

998,366.

Patented July 18, 1911.

2 SHEETS—SHEET 1.

Witnesses
Thos. G. Knox
O. Edwards

Inventor
Victor Mancini
By Victor J. Evans
Attorney

UNITED STATES PATENT OFFICE.

VICTOR MANCINI, OF GRANVILLE, NEW YORK.

TIRE-CHAIN.

998,366.  Specification of Letters Patent.  Patented July 18, 1911.

Application filed February 11, 1911. Serial No. 608,024.

*To all whom it may concern:*

Be it known that I, VICTOR MANCINI, a citizen of the United States, residing at Granville, in the county of Washington and State of New York, have invented new and useful Improvements in Tire-Chains, of which the following is a specification.

This invention relates to tire chains and the object of the invention is the provision of a simple and efficient device of this character which will prevent skidding or slipping of the wheels and in which the principal parts may be readily renewed.

A further object of the invention is the provision of a tire chain including a plurality of wear plates having gripping calks thereon arranged to prevent slipping or skidding of the wheels.

Further objects of the invention will appear as the following specific description is read in connection with the accompanying drawings, which form a part of this application, and in which:—

Figure 1:
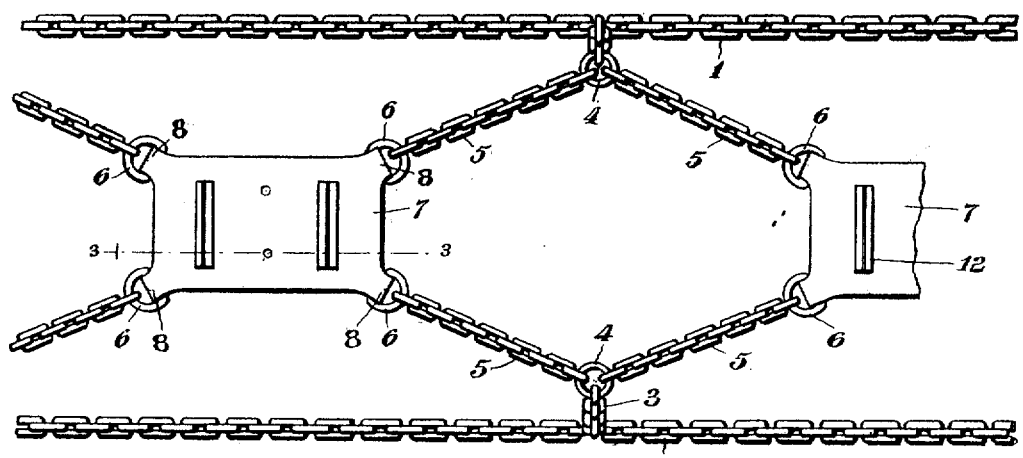
Figure 2:
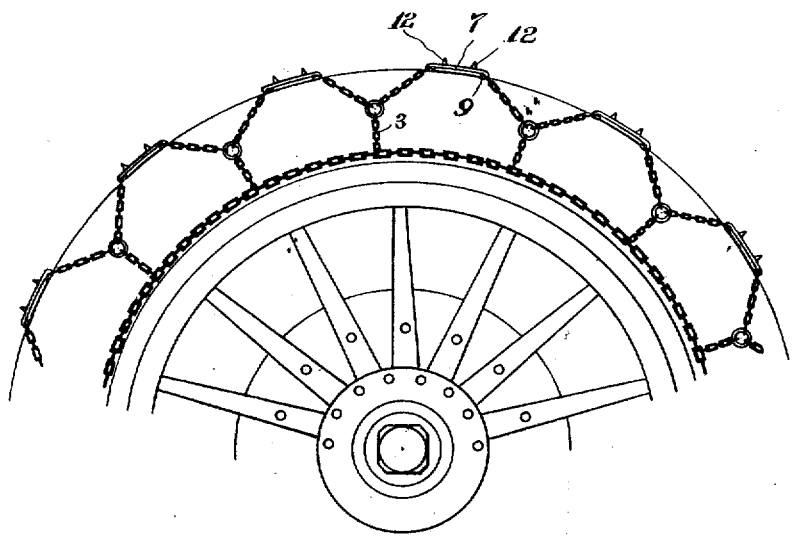
Figure 3:
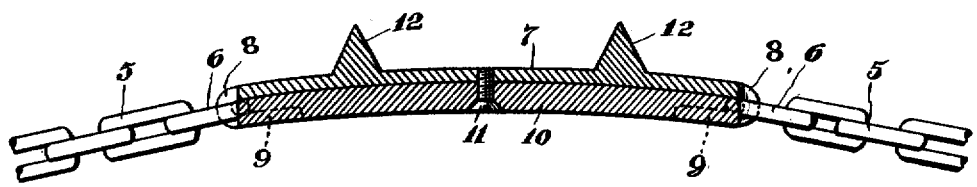
Figure 4:
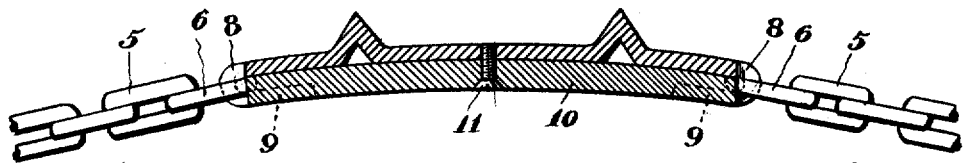
Figure 5:
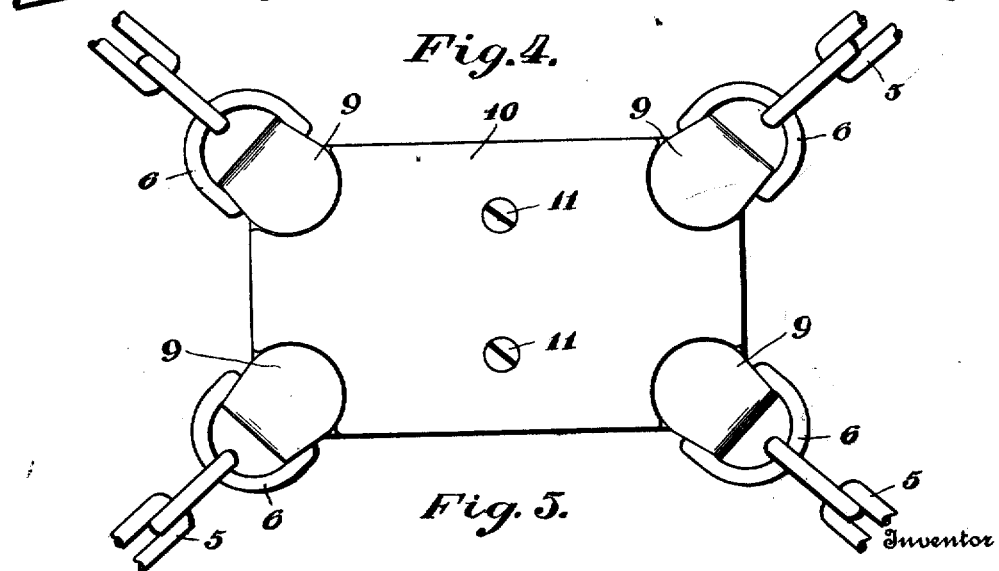

Figure 1 is a plan view of a portion of the chain. Fig. 2 is a detail elevation showing the application of the same to a wheel. Fig. 3 is a detailed longitudinal sectional view on the line 3—3 of Fig. 1. Fig. 4 is a similar section showing a modified form. Fig. 5 is a bottom plan view of one of the anti-skidding plates.

Referring more particularly to the drawings, 1 and 2 represent the side chains to which are connected at intervals the inwardly extending strain chains 3. The inner ends of these strain chains are connected to rings 4 intermediate the length of the plate holding chains 5 which have mounted upon their ends the stirrups 6. The anti-skidding plates are indicated at 7 as provided with diagonally extending corner pieces 8 which are bent back upon the body of the plates so as to provide hooks 9 in which the stirrups are engaged. The stirrups are held in place by a retaining plate 10 which is secured upon the plate 7 in any suitable manner, as by screws 11. The plate 7 has mounted thereon a plurality of calks 12 which may be secured to the plate by welding, by rivets, or by any other suitable device or may be formed integral with the plate, as shown in Fig. 4. These calks may be arranged in any position upon the plates to prevent slipping or lateral skidding.

It will be noticed in Fig. 4 that the plates 10 are curved to conform with the outline of the plate 7 and in Fig. 5 it will be seen that these plates are cut away at their corners to accommodate the ends 8 of the hooks. By removing the plates 10 the stirrups 6 may be readily disconnected from the hooks 9 so that the plates 7 may be renewed or may be removed for attachment of new calks or for any other suitable purpose.

Having thus described the invention, what I claim as new is:—

In combination, a pair of flexible circumferential members, a plurality of separated tread elements having inwardly turned hooks, flexible connecting members having stirrups to removably engage said hooks, filler plates removably carried by the tread elements for holding said stirrups in engagement with the hooks, and connections between the flexible circumferential members and an intermediate portion of the connecting members.

In testimony whereof I affix my signature in presence of two witnesses.

VICTOR MANCINI.

Witnesses:
FLOYD E. COLE,
GEORGE N. HULL.

---

Copies of this patent may be obtained for five cents each, by addressing the "Commissioner of Patents, Washington, D. C."